Jan. 21, 1936. C. H. BECKWITH 2,028,696
VALVE OPERATING UNIT
Filed Feb. 3, 1934 3 Sheets-Sheet 1
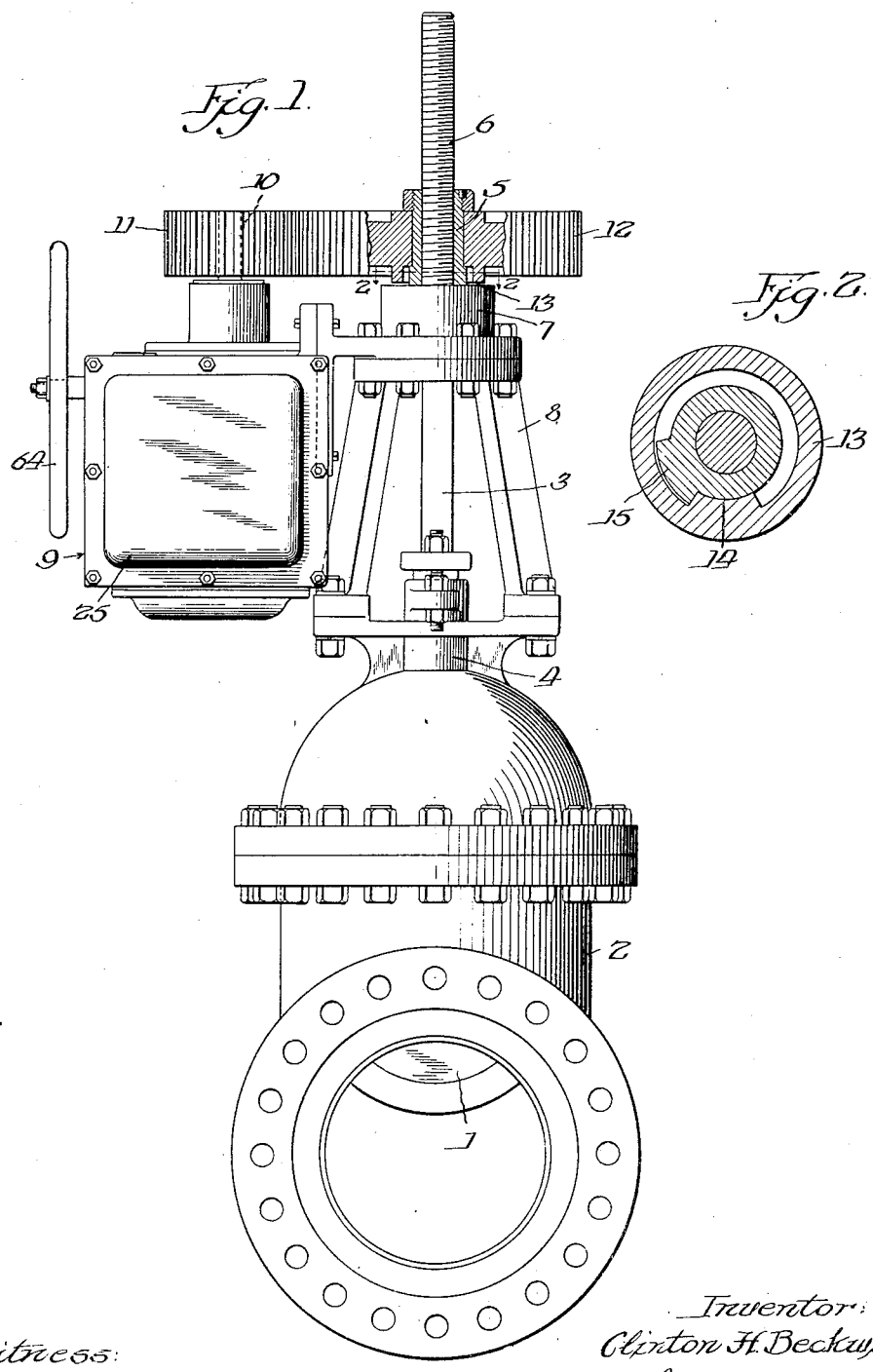

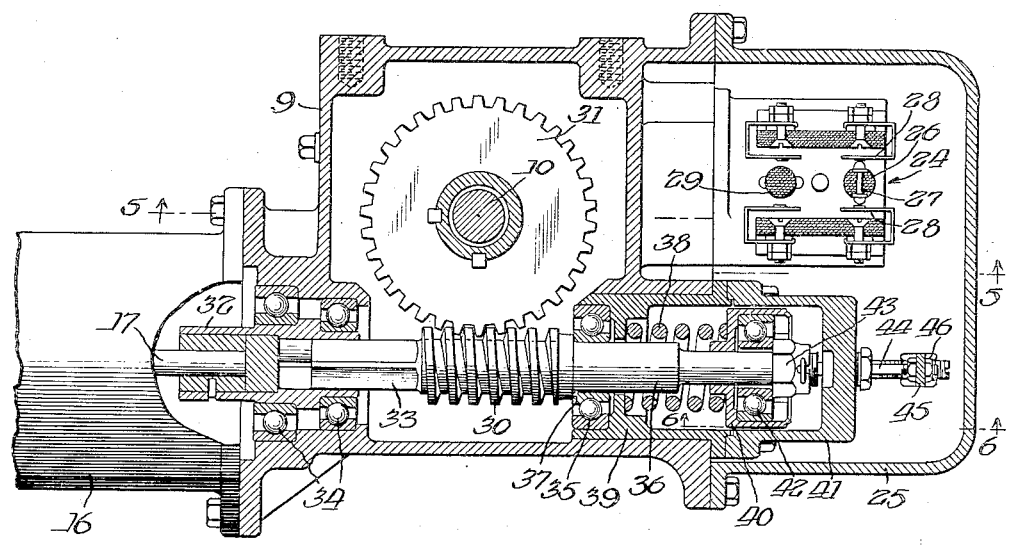
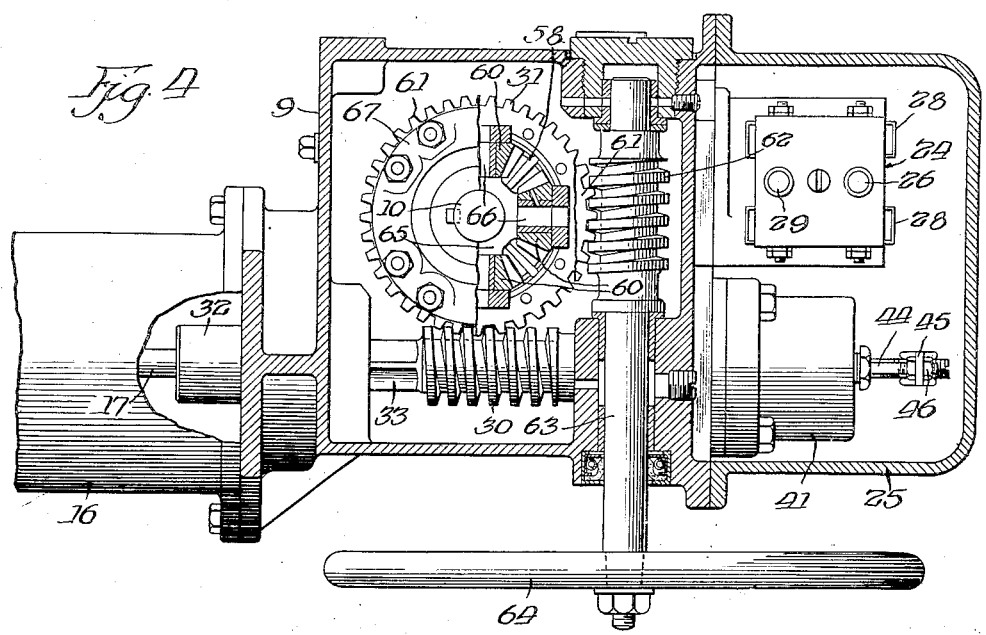

Jan. 21, 1936. C. H. BECKWITH 2,028,696
VALVE OPERATING UNIT
Filed Feb. 3, 1934 3 Sheets-Sheet 3

Witness:
R. B. Davison

Inventor:
Clinton H. Beckwith
By Ira J. Wilson
Atty

Patented Jan. 21, 1936

2,028,696

UNITED STATES PATENT OFFICE 2,028,696

VALVE OPERATING UNIT

Clinton H. Beckwith, Geneva, Ill., assignor to Crane Co., Chicago, Ill., a corporation of Illinois Application February 3, 1934, Serial No. 709,628

14 Claims. (Cl. 137—139)

This invention relates to motor operated valves. Among other objects the invention is intended to provide an improved valve operating unit suitable for power operation of a valve under remote control and embodying means of practicable and advantageous character whereby the valve can be manually operated without disconnecting it from the driving motor.

The invention will be best understood by reference to one practicable construction containing an embodiment of the invention which is shown for illustration in the accompanying drawings.

In said drawings:

Fig. 1 is a side elevation of the illustrative construction comprising a gate valve with operating and motor controlling means embodying the invention;

Fig. 2 is a section taken on the line 2—2 of Fig. 1 illustrating a detail of the particular construction elected for illustration whereby to obtain a hammer blow action in starting the opening and closing movements of the valve;

Fig. 3 is a horizontal sectional view of a part of the operating mechanism, the section being taken on the line 3—3 of Fig. 5;

Fig. 4 is a horizontal sectional view taken on the line 4—4 of Fig. 5;

Figure 5:
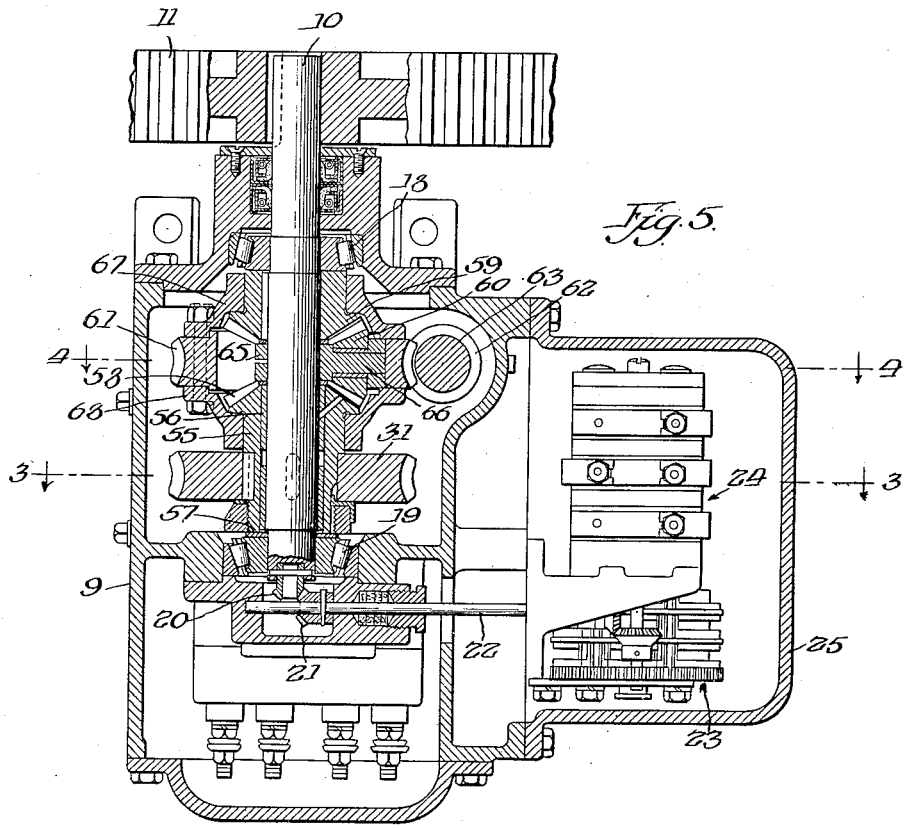
Fig. 5 is a vertical sectional view taken on the line 5—5 of Fig. 3.

For power actuation of a steam gate valve under remote control, or for power actuation under remote control of any valve of the type which in closing moves against a valve seat, it is desirable to control the motor in the valve closing operation in such manner as to shut off the motive power in response to a predetermined resistance to such operation, whereby to obtain a firm seating of the valve under power in every instance while obviating the danger of stalling the motor or injuring the driving mechanism by continued application of power after the valve is closed or after it has encountered such an obstruction as to prevent its further closing movement. On the other hand if a similar control were employed to stop the motor at the end of the valve opening operation, it might result in rendering the operating unit ineffectual to initiate the valve opening operation, since a steam gate valve or other wedge-shaped valve which engages a correspondingly shaped valve seat will frequently require a much greater effort to unseat it than to seat it, and consequently the resistance to the operation of the mechanism due to the effort required to unseat the valve might bring into play the control for the valve opening operation, resulting in stopping the motor before the valve is unseated. Hence the motor should be controlled in the valve opening operation to shut off the motive power when the valve is brought to a predetermined open position, or in the case of an electric motor should be controlled by a limit switch for the valve opening operation. Furthermore, if a steam gate valve or other valve operated through a screw rod or stem should open under power until backseated, any subsequent contraction or expansion of the valve rod would result in a seizing or locking of the valve stem between the valve and its operating nut or other element in which the screw threaded stem is engaged, with the result of requiring an excessive and sometimes almost prohibitive effort to initiate the valve closing movement, which of course would bring into play the control for the valve closing operation with the result of stopping the motor and rendering the unit incapable of closing the valve. It is accordingly desirable that the motor should be controlled in the opening operation to shut off the motive power when the valve is brought to a predetermined open position short of backseating.

Valves which are operated by power under remote control must also be occasionally operated manually by workmen or inspectors. It is desirable to obviate the necessity of disconnecting the valve from the motor for manual operation, so as to avoid the opportunity of accidentally or forgetfully leaving the valve operating mechanism declutched. On the other hand the workman who may be engaged in manually operating the valve must be protected from the possibility of injury in case of the unexpected turning on of the power from the remote control point while he is so engaged.

The illustrative valve operating unit embodying the present invention provides a direct connected positive gear drive connection between the motor and the valve through a mechanism which controls the motor in its valve opening operation to shut off the power when the valve is brought to a predetermined open position, which in the case of a steam gate valve or the like should be a predetermined open position short of backseating; and controls the motor in its valve closing operation to shut off the motive power in response to a predetermined resistance to the operation due to the seating of the valve; said mechanism including means whereby the valve can be manually operated with facility, in a reasonably easy and speedy manner, without the necessity of declutching the operating mechanism from the motor and without liability of injuring the workman by the unexpected turning on of the power while he is engaged in the manual operation, the arrangement being such that the manual operation of the valve will not affect the mechanism with respect to the controls of the motor.

Referring to the drawings, in Fig. 1 a valve to be operated is represented by the disc type gate valve 1 which is movable to and from its seat in the valve housing 2. Such a valve is usually wedge-shaped in cross section and engages a correspondingly shaped seat, so that it would ordinarily require a greater power to unseat it than to seat it. The valve is attached to the valve stem 3 which passes from the housing through the stuffing box 4, said valve stem being guided for vertical movement but held against rotation as usual in valves of this type. Operation of the valve is effected by rotating a nut 5 which engages a screw threaded portion 6 of the valve stem, said nut being revolubly mounted on a support 7 carried by a standard 8 rising from the valve housing.

Attached to the standard 8 is a gear housing 9 containing a motor driven mechanism including a driven shaft 10 on which is secured a gear 11 meshing with a gear 12 on the nut 5. As shown in Figs. 1 and 2 the hub of the gear 12 is rotatably fitted on said nut and has a flange 13 formed with an internal lug 14 to engage a lug 15 on the nut, thus providing a lost motion drive connection between said gear and nut, whereby to impart a hammer blow effect to the valve to initiate its opening and closing movements.

In Figs. 3 and 4, a motor for operating the valve is indicated at 16, the motor being supported by attachment to the gear housing 9. A reversely operable rotary motor is desirably employed, giving a continuous or steady performance for the valve operation and obviating the need of gear shifting devices to reverse the motion derived from the motor. The driven shaft of such rotary motor is indicated at 17. Said motor may be of any approved type, fluid operated or electric, both types being known. In the case of a fluid operated motor, its operation may be controlled to stop the motor at the ends of the valve opening and closing operations by automatic operation of suitable valves controlling the supply of motive fluid to the motor, in accordance with an arrangement such for instance as disclosed in the patent to Beckwith No. 1,886,518 of November 8, 1932.

Various motor circuit arrangements are known to the art whereby an electric motor employed for opening and closing a valve may be controlled to operate in either direction as required, the motor circuit when established for operating the motor in the valve opening direction being controlled by one switch to be automatically operated for stopping the motor, and the motor circuit when established for operating the motor in the valve closing direction being controlled by another switch to be automatically operated for stopping the motor at the end of the valve closing operation. Among various prior patents showing such motor circuit arrangements, reference may be made, for example, to the patent to Hayden No. 828,547 of August 14, 1906. In the illustrative valve operating unit shown in the accompanying drawings, the use of an electric motor may be assumed, its circuit for operating the motor in the valve opening direction being established through the normally closed switch or switches controlled by the limit switch mechanism hereinafter referred to, and its circuit for operating the motor in the valve closing direction being established through a normally closed switch or switches controlled by the hereinafter mentioned mechanical means for operation in response to a predetermined resistance to the valve closing operation.

Referring to Figs. 3 to 5, the shaft 10, operatively connected with the valve as previously described, is driven from the motor through a worm drive shown in Fig. 3 and a differential mechanism shown in Fig. 5, the differential mechanism being between the worm drive and the shaft. Said shaft 10, which in this instance is vertically disposed, is mounted in suitable bearings 18 and 19 which are shown as bearings of the type comprising tapered bearing rollers engaging bearing cone rings affixed on the shaft, the arrangement being such that the lower bearing supports the shaft and other elements associated therewith. The two bearings are symmetrically arranged so as to take end thrust on the shaft in opposite directions.

Driven from the shaft 10 by the bevel gears 20 and 21 (Fig. 5) is a small shaft 22 which operates the mechanism 23 of a limit switch indicated as a whole by the numeral 24. This limit switch device, which is enclosed by a removable cover 25 attached to the gear housing 9, includes the switch or switching means for controlling the motor circuit in the valve opening operation. Said switch in this instance comprises a rotatable post 26 of insulating material having a transverse metal pin 27 the headed ends of which are normally in contact with the pair of circuit terminals or switch contact members 28. It will be understood that this normally closed switch is included in the circuit of the motor when established for operating the motor in the valve opening direction, or else that such switch is included in any suitable control circuit for another normally closed switch in said motor circuit. The mechanism of the limit switch device is such that when it is operated in one direction to a predetermined position (regulatable by suitable adjusting means embodied in the instrument) it will give a quarter turn to the post 26, thereby opening the switch, and when operated in the reverse direction from such position the post will resume its normal switch closing position. The limit switch mechanism is so arranged and adjusted in relation to the valve operating mechanism as to effect the opening of the limit switch when the valve in its opening movement reaches a predetermined open position short of backseating, thereby shutting off the motive power. The specific details of the limit switch device illustrated herein are not a part of the present invention, the said device being a known instrument which is manufactured by Westinghouse Electric and Manufacturing Company of East Pittsburgh, Pennsylvania, under its Serial Number S-855,911, known as said company's I-G type limit switch, otherwise commonly referred to as the cyclometer or skip tooth gear type. Various other limit switch instruments are known comprising a switch and mechanism whereby pursuant to a predetermined operation in one direction the switch will open and whereby upon a reverse operation from the position at which the switch opened it will close.

In Fig. 3, the numeral 29 indicates the rotatable switch post of a normally open switch to control a signal circuit (not shown). This signal switch is operated by the limit switch mechanism in precisely the same manner as the limit switch except that the signal switch is normally open and closes when the valve reaches its predetermined open position. Another precisely similar switch, not shown, may be controlled by the post 29 to actuate a signal when the valve is brought to a predetermined closed position. The signaling means would preferably consist of electric lights the circuits of which are controlled by the switches to cause the respective signal lamps to light when the valve reaches the respective predetermined opened and closed positions, or the signal circuits may be such as to cause said lights to light during any intermediate position of the valve and to become extinguished when the valve is in its predetermined open or predetermined closed position.

Figure 6:
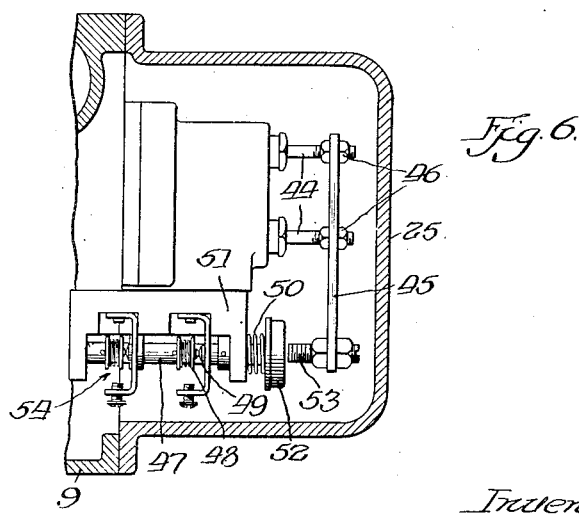
Fig. 6 is a sectional elevation taken on the line 6—6 of Fig. 3.

For controlling the motor in the valve closing operation so as to shut off the motive power in response to a predetermined resistance due to the seating of the valve or its encountering such an obstruction by reason of accumulation of sediment on the valve seat as to cause such resistance, the worm drive embodied in the motor driven valve operating mechanism, shown in Fig. 3, is of such character as to permit and cause an endwise displacement of the driving worm from its normal operating position when such resistance to the valve closing operation occurs, the resistance being determined by a spring in connection with the worm, and such displacement of the worm is utilized to actuate a switch to stop the motor. The specific construction and arrangement for this purpose, as shown in Figs. 3 and 6, is substantially the same as that disclosed in the Beckwith Patent No. 1,943,854 of January 16, 1934. The worm 30, driving the worm wheel 31, is driven from the motor through a slip joint coupling provided by the tubular shaft 32 in which the worm shaft extension 33 is splined or slidably but non-rotatably fitted, said tubular shaft, which is secured to the motor shaft, being mounted in suitable bearings 34 and held from endwise displacement by an external shoulder interposed between said bearings. The worm shaft, supported at one end by the coupling sleeve or tubular shaft 32, is otherwise supported by the bearing 35 through which the worm shaft is slidable, there being an extension 36 of the worm shaft projecting beyond said bearing. The shoulder 37 of the worm shaft coacting with the worm shaft bearing 35 limits the endwise movement of the worm in the direction of the end thrust imposed thereon in the valve opening operation. Endwise movement of the worm in the opposite direction is resisted by the spring 38 acting between the housing member 39 and a swiveled member 40 on the worm shaft extension 36. When in the valve closing operation the resistance encountered is sufficient to overcome the power of the spring 38, the continued application of power to the worm with accompanied checking of the worm wheel will cause an endwise displacement of the worm by climbing the worm wheel, with accompanying shutting off of the motive power. In the valve opening operation the resistance due to the inertia and the friction of mechanism will cause the worm to resume its normal operative position with the thrust shoulder 37 against the abutment member which in this instance is provided by the worm shaft bearing 35. Said worm shaft bearing 35 is shown mounted in the detachable housing member 41, said members 39 and 41 cooperating to house the worm shaft extension, spring and swiveled member 40. Said swiveled member 40 is mounted on the worm through the bearing unit 42, and secured by the nut 43 by adjustment of which the tension of the spring 38 is regulated to determine the resistance at which the worm shaft will become displaced. Attached to the swiveled member 40 by the screw rods 44 is a switch arm 45 (Fig. 6), adjustably secured on said rods by means of the adjusting nuts 46.

The switch arm 46 is arranged to operate suitable switching means for controlling the motor circuit to stop the motor. The specific construction of switching means shown in Fig. 6 is not a feature of the present invention, but is described as follows: The numeral 47 denotes a slidably mounted rod of insulating material which carries a metallic switch contact member 48 in contact with a stationary contact member 49, these contact members being circuit terminals. The two contact members are normally held in contact by the spring 50 acting between the support 51 and the head 52 of the rod 47 carrying the contact member 48. This normally closed switch represented by the contacting contact members 47 and 48 is included in the motor circuit when established for operating in the valve closing direction, or in a controlling circuit for another normally closed switch included in such circuit. When the worm 30 is axially displaced in response to the predetermined resistance encountered by the seating of the valve, the switch arm 45 is moved in such direction that the adjustable tappet 53 carried thereby engages the head 52 of the rod 47, forcing said rod in a direction to separate the switch contact members, thus opening the switch and causing the opening or disestablishment of the motor circuit to shut off the motive power. A second switch indicated as a whole by the numeral 54, identical with the one just described and operable concurrently therewith by the same means, is shown in this instance. Either one or both of said switches may represent the switching means for controlling the motor circuit. In some instances, as in the case of employing a three-phase alternating current motor, it may be desirable to have the motor circuit established through the two sides of the circuit by normally closed switches, both to be opened concurrently for stopping the motor. For the same reason the limit switch represented by the contact elements 27 and 28 may be duplicated, that is to say the limit switch post 26 may carry an additional contact member as 27 to make contact with an additional set of contact members as 28. These of course are matters which will be understood by those familiar with the electric motor art.

By the means described, as in the cases of the previously cited Beckwith patents, the motor is controlled by the driving mechanism in such manner as to stop the motor when in the valve opening operation the valve is brought to a predetermined position short of backseating, and to stop the motor in its valve closing operation in response to a predetermined resistance due to the seating of the valve or the encountering of a sufficient obstruction to prevent full seating as aforesaid, thus attaining the advantage of firm seating of the valve in every instance without liability of stalling the motor or injuring the mechanism, and having the full power which the motor is capable of delivering available for initiating the valve opening and closing operations, and avoiding the objection of backseating under power which might result from such a seizure of the valve stem as to require an excessive effort beyond that of the capability of the motor to initiate the closing operation; in consequence of which a motor of moderate capacity sufficient for the unseating effort may be employed.

Referring to Fig. 5, the worm wheel 31 is fast on a tubular shaft 55 which encloses the shaft 10, a bushing 56 being interposed. Said tubular shaft 55 rests on a wear plate 57 supported on the bearing cone member of the lower tapered roller bearing unit. On the upper end of the tubular shaft 55 is a bevel gear 58 confronting a similar bevel gear 59 fast on the shaft 10, the said symmetrically arranged bevel gears being engaged by a set of bevel pinions 60. These pinions 60 are carried by a spider provided by a worm wheel 61 adapted to be driven by the worm 62 on the shaft 63 which is mounted as shown in Fig. 4 and adapted to be operated by the hand wheel 64. The worm wheel 61 comprises an annular rim connected with its hub portion 65 through radial spider arms 66 constituting the axles of the bevel pinions 60. The hub of the worm wheel 61 is supported on the upper end of the tubular shaft 55, a suitable liner being interposed. Housing members 67 and 68 attached by through bolts to the annular rim portion of the worm gear 61, and rotatably fitted to the hubs of the bevel gears 58 and 59, cooperate with the worm wheel 61 to enclose the two bevel gears and interposed bevel pinions.

The two worms 30 and 62 are self-locking against operation by the worm wheels, or in other words each worm can drive its own worm wheel but neither can be driven by its worm wheel, which, as is well understood in the mechanical arts, can be accomplished by adopting an appropriate worm screw thread pitch of less than 50°, since at a pitch of less than 50° the friction of the parts even if quite accurate would be sufficient to prevent the operation of the worms by the worm wheels. The same effect could be accomplished by less accurate construction of the worm and worm wheel gears, though of course an accurate construction and consequent less friction is to be preferred. It follows that when the mechanism is being operated by the motor, the hand wheel shaft being idle, the worm wheel 61 is held from rotation by its worm and the drive from the motor to the valve is communicated through the worm 30, worm wheel 31, bevel gear 58, bevel pinions 60 rotating in the stationary spider, and bevel gear 59 on the shaft 10; the drive in this instance not communicating any rotation to the worm wheel 61 since it is incapable of driving the idle hand wheel shaft 63. On the other hand, when the valve is operated from the hand wheel 64, the motor being idle, the drive from the hand wheel to the valve is through the worm 62, worm wheel 61, bevel pinions revolving therewith in engagement with the now stationary bevel gear 58, and the bevel gear 59 on shaft 10; and in this drive no motion is communicated to the bevel gear 58 and worm wheel 31 since the latter is incapable of driving its worm. However the shaft 10 can be concurrently driven from the motor and the hand wheel through the two worm drives, and the two worm drives can operate in opposite directions, because of the differential mechanism which is provided by the bevel gears 57, 58 and the interposed pinions 60. Thus the valve can be operated independently by hand or by motor, and if a workman should be engaged in hand operation of the valve at a time when the power should be turned on at a remote control point for operation of the motor either in the same direction as or the opposite direction from that in which the hand operation is being made, it will have no other effect upon the workman than merely to accelerate or decelerate the motion which he is communicating by hand, and this will not be felt as an objectionable effect or one that is likely to cause him injury or discomfort.

The mechanism provides a mechanically advantageous means for hand operation, through a worm drive, and at the same time permits the hand operation to be accomplished through a higher gear drive than that for the motor operation, so that, while the worm drive 31 for the motor may be sufficient to obtain the desired speed reduction from the motor, the workman when engaged in hand operation has a higher gear mechanism under his control so that he can work more speedily than if he had to work through the same gear ratio as that for the motor drive. Also as the hand operated means is interposed between the worm drive from the motor and the driven shaft 10, the workman is relieved of the necessity in the hand operation of operating the entire body of mechanism which is contained in the gear housing.

One of the important advantages afforded by a valve operating mechanism of the character described is that under heavy load conditions the motor operation of the valve can be materially assisted by hand operation. For instance, valves used in refinery service on certain process work are subject to a condition which is commonly known as coking, which means that a very strong tenacious material as a product of combustion is formed within the pipe line and virtually freezes to the discs or to the seats or both, depending upon whether the valve is closed or open, and rendering it highly difficult to operate the valve; so that the motor itself, although selected for heavy service, frequently is unable to deliver the necessary power required to overcome the extreme resistance to valve operation due to the coking. Under this sort of a condition, hand operation can be employed to help the motor in the following manner. If the hand wheel is turned in the reverse direction to that in which the motor is driving the valve, it slows down the speed of the drive shaft with a corresponding increase in torque. Therefore the combination drive by the motor and hand operation permits of greater torque for operating the valve than would be obtainable by hand or motor operation separately.

In addition to the foregoing advantage, it is also frequently desirable to be able to operate a valve, in either opening or closing, more quickly than the motor itself normally permits. Here again the advantage of hand operation in combination with motor operation is apparent. By turning the hand wheel the same speed as the gearing being rotated by the motor in the same direction at which the motor is driving the valve, it is possible to obtain an increase in speed of the drive shaft with a corresponding decrease in torque.

In some cases valves are located behind machinery or in other situations in which they are not conveniently accessible for hand operation. With the illustrated construction, the hand shaft may be extended or coupled with another operating shaft so that the mechanism can be operated by hand from a hand wheel located at a distance from the valve.

It will be understood that the illustrated valve operating unit may be variously modified in details of construction and arrangement to suit various different conditions and requirements; moreover that the invention is not essentially limited to the conjoint use of all features thereof, since the same may be advantageously used in various different combinations and subcombinations.

What I claim as my invention, and desire to secure by Letters Patent, is:

1. A valve operating unit comprising a motor, a hand operating means, a mechanism in permanent geared connection with said motor and hand means and the valve whereby the valve can be operated in either direction from the motor or hand means through a direct connected positive driving mechanism, said mechanism comprising a portion operable only by the motor and a portion operable only by the hand means and a valve-operating portion operable in common by the other two, means controlled by a portion of the mechanism operable either by the motor or the hand means for rendering the motor ineffectual when in the valve opening operation the valve is brought to a predetermined open position, and means controlled by a motor operated portion of said mechanism for rendering the motor ineffectual when under the applied power of the motor a predetermined resistance to the valve closing operation is encountered.

2. A valve operating unit comprising a motor, a hand operating means, a mechanism in permanent geared connection with said motor and hand means and the valve whereby the valve can be operated in either direction from the motor or hand means through a direct connected positive driving mechanism, said mechanism comprising a portion operable only by the motor and a portion operable only by the hand means and a valve-operating portion operable in common by the other two, and means for controlling said motor in such manner as to prevent opening of the valve beyond a predetermined limit and to allow seating of the valve under power in closing, said means including means controlled by a common operable portion of said mechanism in the valve opening operation to shut off the power as the valve reaches a predetermined open position and means controlled by a motor operated portion of said mechanism to shut off the motive power when in the valve closing operation under the applied power of the motor a predetermined resistance is encountered due to the seating of the valve, said motor operated portion of the mechanism comprising means displaceable from normal operative position in response to such predetermined resistance to the valve closing operation, and the operation of the last named motor controlling means to shut off the motive power being effected by such displacement of said displaceable means.

3. In a valve operating unit, the combination comprising a valve of the type which may require a greater effort to unseat than to seat it and the backseating of which under power in opening may necessitate an excessive effort to initiate its closing movement, a motor, a hand operating means, a mechanism in permanent geared connection with said motor and hand means and valve whereby the valve can be operated in either direction from the motor or the hand means through a direct connected positive driving connection, said mechanism including a portion operable only by the motor and a portion operable only by the hand means and a portion operable in common by the other two, motor controlling means operable to render the motor ineffectual in the valve opening operation, means controlled by a common operable portion of said mechanism for operating said motor controlling means, other motor controlling means for rendering the motor ineffectual in the valve closing operation, and means controlled by a motor operated portion of said mechanism for operating said last mentioned motor controlling means when in the valve closing operation under the applied power of the motor a predetermined resistance to such operation is encountered.

4. In a valve operating unit, the combination comprising a valve of the type which may require a greater effort to unseat than to seat it and the backseating of which under power in opening may necessitate an excessive effort to initiate its closing movement, a reversely operable motor having a drive shaft, a hand shaft, a transmission mechanism comprising a direct connected positive driving connection between one of said shafts and the valve, a portion of said mechanism comprising a direct connected positive driving connection between the other of said shafts and the valve, said mechanism permitting independent operation of the valve in either direction by the motor or by the hand means, motor operating means whereby the motor can be operated in either direction as required in response to remote controls, and two means controlling said motor operating means, one of said means being operable to shut off the motive power in the valve opening operation and the other operable to shut off the motive power in the valve closing operation, means operable by a portion of said mechanism drivable either from the motor or hand means for operating said first controlling means when the valve in its opening operation reaches a predetermined position short of backseating, and means controlled by a motor operated portion of said mechanism for operating said second controlling means when in the valve closing operation under the applied power of the motor a predetermined resistance to such operation is encountered due to the seating of the valve.

5. A valve operating unit comprising a motor, a worm drive mechanism operable in either direction only by the motor, a hand shaft, a worm drive mechanism operable in either direction only by said hand shaft, a transmission mechanism operable through either of said worm drive mechanisms, said transmission mechanism being in permanent geared connection with each of said worm drive mechanisms and including means operable in one manner from one of said worm drive mechanisms and operable in another manner from the other of said worm drive mechanisms, means controlled by said transmission mechanism for rendering the motor inoperative when the valve in its opening movement reaches a predetermined open position, and means controlled by a motor operated portion of said mechanism for rendering the motor inoperative when in the valve closing operation under the applied power of the motor a predetermined resistance to such operation is encountered.

6. A power operated valve opening and closing device comprising a reversely operable motor having a driven shaft, a hand operable shaft, a direct connected positive driving mechanism connecting one of said shafts with the valve, said mechanism including a worm and worm wheel driven thereby and further including a differential mechanism, said differential mechanism comprising a pair of gears and connecting gear means, a worm wheel having said connecting gear means mounted therein, a driving worm in engagement with said last mentioned worm wheel operable by the other of said shafts, the two worms being self-locked against reverse driving by their respective worm wheels, whereby the valve may be independently operated from the motor or hand means, means controlled by an element of said mechanism drivable through either of the two worm drives to stop the power actuation of the mechanism when in the valve opening operation the valve reaches a predetermined open position, the worm driven by the motor being mounted and connected to permit it to be moved endwise by climbing its worm wheel, a fixed end thrust abutment with which said worm coacts in the valve opening operation, a spring urging said worm in the same direction as the thrust imposed thereon in the valve opening operation and normally effectual to prevent displacement thereof in the opposite direction, and means operable by axial displacement of said worm to stop the power actuation of the mechanism in the valve closing operation in response to a predetermined resistance to such operation sufficient to cause such displacement against the operation of said spring, said worm when driven in the direction for the valve opening operation resuming its normal operative position in cooperative relation with said end thrust abutment.

7. A power operated valve opening and closing device comprising a reversely operable motor having a driven shaft, a hand operable shaft, a direct connected positive driving mechanism connecting one of said shafts with the valve, said mechanism including a worm and worm wheel driven thereby and further including a differential mechanism between said worm wheel and said valve, said differential mechanism comprising a pair of gears and connecting gear means, a worm wheel having said connecting gear means mounted therein, a driving worm in engagement with said last mentioned worm wheel operable by the other of said shafts, the two worms being self-locked against reverse driving by their respective worm wheels, whereby the valve may be independently operated from the motor or hand means, means controlled by said mechanism to stop the power actuation of the mechanism when in the valve opening operation the valve reaches a predetermined open position, and means controlled by said mechanism to stop the power actuation thereof in response to a predetermined resistance to the valve closing operation.

8. A power operated valve opening and closing device comprising a motor, direct connected positive driving mechanism connecting said motor with the valve, said mechanism including a worm and worm wheel and a differential mechanism between the worm wheel and valve, said worm being mounted and connected to permit it to be moved endwise by climbing the worm wheel, a fixed end thrust abutment with which the worm coacts in the valve opening operation, a spring urging the worm in the same direction as the thrust imposed thereon in the valve opening operation and normally effectual to prevent displacement thereof in the opposite direction, said differential mechanism comprising a pair of gears and connecting gear means, a manually operable worm and a worm wheel drivable thereby carrying said connecting gear means between said pair of gears, the two worms being self-locked against reverse driving by their respective worm wheels, means controlled by an element of said mechanism drivable through either of the two worm drives to stop the power actuation of the mechanism in the valve opening operation when the valve reaches a predetermined open position, and means operable by bodily displacement of said first mentioned worm to stop the power actuation of the mechanism in the valve closing operation in response to a predetermined resistance to such operation sufficient to cause such displacement against the operation of said spring, said first mentioned worm when driven in the direction for the valve opening operation resuming its normal operative position in cooperative relation with said end thrust abutment.

9. In a power operated valve, the combination with the valve to be operated, of power actuated means for opening and closing said valve comprising a motor, direct connected positive driving mechanism connecting said motor with the valve, said mechanism including a differential transmission means comprising a pair of confronting bevel gears and interposed bevel pinions in mesh with said gears, an independently manually operable carrier for said pinions, the operating means for said carrier being of such character as to hold the carrier stationary during the motor operation of the mechanism and the operating means for said differential transmission being of such character as to hold the driving element thereof stationary during hand operation of said carrier, whereby the valve can be operated either from the motor or from the hand operated means, motor controlling means operable to stop the valve opening operation of the motor, means controlled by said mechanism to operate said motor controlling means when the valve reaches a predetermined open position, independent motor controlling means operable to stop the valve closing operation of the motor, and means controlled by said mechanism to operate said last named motor controlled means only in response to a predetermined resistance to the valve closing operation in the motor operation thereof, said mechanism including transmission means independent of said carrier displaceable in the power actuated valve closing operation in response to said resistance and by displacement of which the said last mentioned motor controlling means is operated.

10. A power operated valve opening and closing device comprising a motor, direct connected positive driving mechanism connecting said motor with the valve, said mechanism including a worm and worm wheel driven thereby and further including a differential mechanism, said worm being mounted and connected to permit it to be moved endwise by climbing the worm wheel, a fixed end thrust abutment with which the worm coacts in the valve opening operation, a spring urging the worm in the same direction as the thrust imposed thereon in the valve opening operation and normally effectual to prevent displacement thereof in the opposite direction, said differential mechanism comprising a pair of confronting bevel gears and interposed bevel pinions in mesh with said gears, a manually operable worm and a worm wheel drivable thereby carrying said pinions, the valve being operable either from the motor through the first mentioned worm and worm wheel or from the hand operable means through the second mentioned worm and worm wheel, both worms being self-locked against reverse driving by their respective worm wheels, means controlled by an element of the mechanism drivable from either source to render the motor ineffectual for valve opening operation when the valve in said operation reaches a predetermined open position, and means controlled by said first mentioned worm to render the motor ineffectual for valve closing operation in response to a resistance to such operation under power sufficient to cause displacement of said worm against the opposition of said spring, said worm when driven in the direction for the valve opening operation resuming its normal operative position in cooperative relation with said end thrust abutment.

11. A power operated valve opening and closing device comprising a motor, direct connected positive driving mechanism connecting said motor with the valve, said mechanism including a worm and worm wheel driven thereby and further including a differential mechanism, said differential mechanism comprising a pair of confronting bevel gears and interposed bevel pinions in mesh with said gears, a hand shaft having a worm, a worm wheel driven thereby carrying said pinions, the two worms being self-locked against reverse driving by their respective worm wheels, means controlled by a portion of said mechanism driven from either the motor or hand shaft to render the motor inoperative when in the valve opening operation the valve reaches a predetermined open position, and means controlled by a motor driven portion of said mechanism for rendering the motor inoperative when in the valve closing operation under the applied power of the motor a predetermined resistance to such operation is encountered.

12. A valve operating unit comprising a reversely operable motor, a shaft driven thereby, a hand operated shaft, a direct connected positive driving mechanism including a worm drive between one of said shafts and the valve, said mechanism including a differential transmission comprising a pair of confronting bevel gears and interposed bevel pinions in mesh with said gears, a spider carrying said pinions, means for bodily rotating said spider comprising a worm drive from the other of said shafts, automatic means controlled by said mechanism to stop the power actuation thereof at the end of the valve opening operation, and automatic means controlled by a motor driven part of said mechanism to stop the power actuation thereof at the end of the valve closing operation.

13. A valve operating unit comprising a motor, a motor driven shaft, a hand operated shaft, driving worms on the respective shafts, worm wheels engaged and drivable by the respective shafts, confronting bevel gears and interposed bevel pinions in mesh with said bevel gears, a revoluble spider carrying said bevel pinions, one of said worm wheels being in driving connection with one of said bevel gears and the other of said bevel gears being in driving connection with the valve to be operated, the other worm wheel being in driving connection with said spider, automatic means controlled by said mechanism to stop the power actuation thereof at the end of the valve opening operation, and automatic means controlled by a motor driven part thereof to stop the power actuation thereof at the end of the valve closing operation.

14. A valve operating unit comprising a motor, a direct connected positive driving mechanism between the motor and valve, said mechanism comprising a worm drive and a differential transmission, said differential transmission comprising confronting bevel gears and interposed bevel pinions, a hand shaft, means for bodily rotating said interposed bevel pinions comprising a worm drive from said handshaft, automatic means controlled by said mechanism to stop the power actuation thereof at the end of the valve opening operation, and automatic means controlled by a motor operated portion of said mechanism to stop the power actuation thereof at the end of the valve closing operation.

CLINTON H. BECKWITH.